United States Patent [19]
Waaske

[11] 3,750,549
[45] Aug. 7, 1973

[54] PHOTOGRAPHIC ROLL FILM CAMERA WITH A MOVABLE LENS TUBE

[75] Inventor: Heinz Waaske, Braunschweig, Germany

[73] Assignee: Rollei-Werke Franke & Heidecke, Braunchweig, Germany

[22] Filed: Oct. 15, 1971

[21] Appl. No.: 189,687

Related U.S. Application Data

[63] Continuation-in-part of Ser. No. 150,983, June 8, 1971, abandoned, and a continuation-in-part of Ser. No. 150,984, June 8, 1971, abandoned.

[30] Foreign Application Priority Data

June 10, 1970 Germany............ P 20 28 430.4
June 10, 1970 Germany............ P 20 28 431.5

[52] U.S. Cl. ............................... 95/11 R, 95/32
[51] Int. Cl. ............................................ G03b 19/02
[58] Field of Search ................ 95/11 R, 39, 40, 95/32

[56] References Cited
UNITED STATES PATENTS

| | | | |
|---|---|---|---|
| 3,616,738 | 11/1971 | Susumu Fujita | 95/11 R X |
| 3,585,916 | 6/1971 | Lange | 95/39 |
| 3,087,400 | 4/1963 | Brandt | 95/40 |
| 3,103,151 | 9/1963 | Borghesani | 95/40 |
| 3,504,605 | 4/1970 | Scudder et al. | 95/11 R |

Primary Examiner—Samuel S. Matthews
Assistant Examiner—Kenneth C. Hutchison
Attorney—Charles Shepard

[57] ABSTRACT

A roll film camera in which the lens tube moves forwardly to a picture-taking position when pictures are to be taken, and rearwardly to a collapsed or compact position for carrying or storage. In the rear position, the lens tube does not project at all beyond the front wall of the camera, but is completely behind the front wall, and the lens tube opening in the front wall is closed by a laterally movable closure member. A single actuating member, preferably in the form of a telescopic part of the camera case or housing, operates through various linkages to uncover the lens tube opening in the front wall of the camera and project the lens tube forwardly through it and lock the lens tube in its forward or picture-taking position, when the actuating member is moved in one direction, and to unlock the lens tube and move it rearwardly to its collapsed position within the body and then close the lens tube opening in the front wall of the body, when the actuating member is moved in the opposite direction.

6 Claims, 9 Drawing Figures

PHOTOGRAPHIC ROLL FILM CAMERA WITH A MOVABLE LENS TUBE

CROSS REFERENCES TO RELATED APPLICATIONS

This application is a continuation-in-part of my application Ser. No. 150,983, filed June 8, 1971, and my application Ser. No. 150,984, also filed June 8, 1971, both abandoned.

BACKGROUND OF THE INVENTION

For the sake of compactness, it is desirable to have the lens of a camera, and preferably also the shutter thereof, carried by a lens tube which is axially movable to an extended or forward position when photographs are to be taken, and to a rearward or collapsed or compact position when pictures are not being taken, for easier handling and transportation. Examples of such constructions are shown in applicant's U.S. Pat. No. 3,543,660, granted Dec. 1, 1970, and in certain of the references cited in that patent. However, in most of the prior constructions of this general type, including applicant's prior patent mentioned, the lens tube even in its retracted or rearward position still projects to at least a slight extent forwardly from the front wall of the camera body or casing, thus forming a projecting part which is likely to catch on clothing or other objects while the camera is being carried, and preventing the closing of the front of the camera in a relatively smooth and unbroken manner.

As distinguished from these prior constructions, it is an object of the present invention to provide a camera in which the axially movable lens tube, in its retarded position, is completely behind the plane of the front wall of the camera casing, thereby enabling the lens tube opening in the front wall to be closed by a laterally movable closure member which not only protects the lens tube and its lens but also serves to provide a front wall which is substantially flat or smooth, having no projections likely to catch on clothing or other articles.

Another object is the provision of such a camera having simple, sturdy, and inexpensive mechanism for opening the lens tube aperture in the front wall of the camera, advancing the lens tube through the aperture, and locking the lens tube in its forward or picture-taking position, all by a single motion of an actuating member in one direction, and for unlocking the lens tube, moving it rearwardly to a position within the camera housing, and closing the lens tube aperture in the front wall, all by a single motion of the actuating member in the opposite directions.

Still another object is the provision of a camera which fulfills the objects above mentioned, and in which the actuating member is a member which is arranged telescopically with respect to the main part of the camera body or housing, sliding longitudinally in one direction or the other with respect to the main part.

A further object is the provision of a camera in which the same actuating member which advances or retracts the lens tube serves also to advance the film.

A still further object is the provision of such a camera, so designed that the operating connection between the above mentioned actuating member and the operating parts which advance or retract the lens tube may be temporarily disconnected when desired, thus enabling the actuating member to be moved for advancing the film from one frame to the next frame without necessarily retracting and again advancing the lens tube, such operation being desirable when pictures are to be taken in rapid sequence.

DESCRIPTION OF THE PREFERRED EMBODIMENT

The preferred embodiment of the invention comprises a camera having the basic part 1 in the form of a body or housing containing in it or mounted on it all essential camera parts including the lens tube 2, the shutter release button or plunger 3, and various conventional parts not specifically shown or described in detail, such as a suitable shutter, suitable means for holding film, and conventional film feeding means for advancing the film step by step from one frame position to another. The camera also includes a movable actuating member mounted on the body or housing 1, effective when moved in one direction to advance the lens tube forwardly to picture-taking position, after first uncovering the lens tube opening in the front wall of the camera body, and effective when moved in the opposite direction to retract the lens tube to a position completely within the camera and then to close the lens tube opening by a slide member. On either the retracting stroke or the projecting stroke of this actuating member, the film is also fed.

Figure 1:
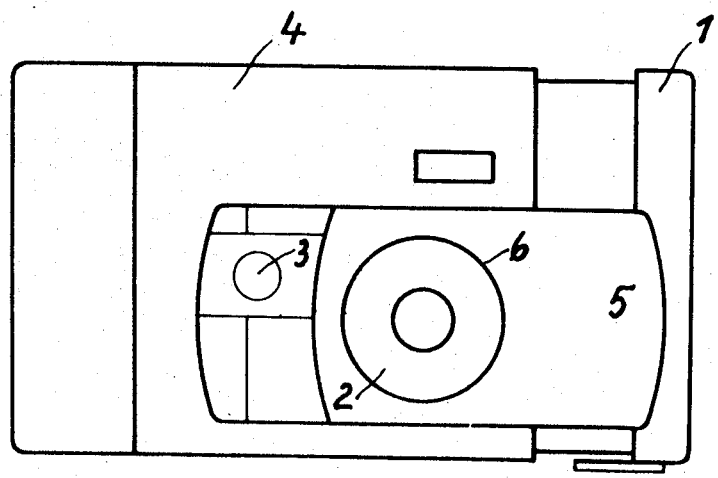
FIG. 1 is a front elevational view of a camera according to a preferred embodiment of the invention, with the parts in picture-taking position, the lens tube being extended.
Figure 2:
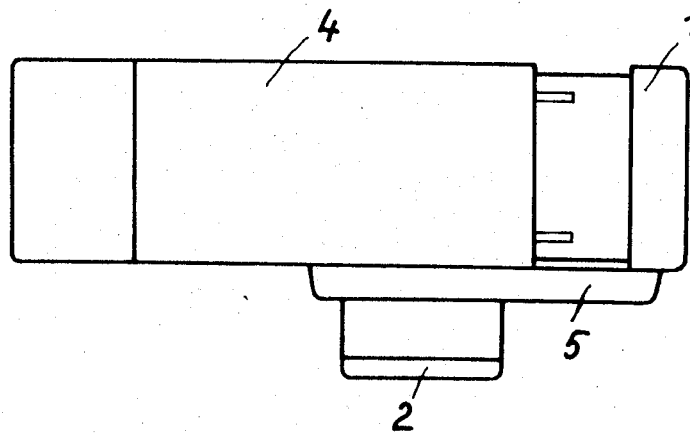
FIG. 2 is a top plan view of the same, with the parts in the same position.
Figure 3:
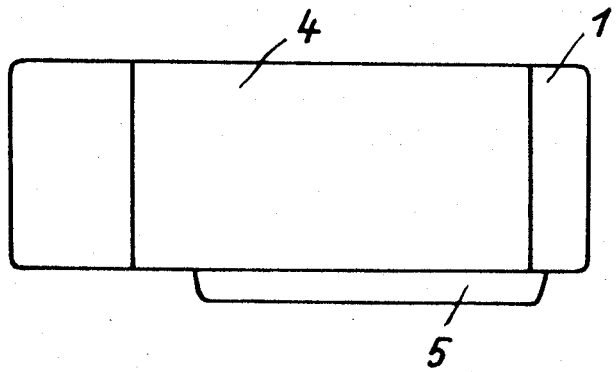
FIG. 3 is a top plan view of the camera in the closed position for carrying or storage, the lens tube being retracted within the body.

Preferably but not necessarily, the actuating member which advances and retracts the lens tube is in the form of a member telescopically mounted on the camera body, the member being pushed telesopically onto the body in surrounding relation to a portion of the body in order to retract the lens tube and close the lens tube opening, and being pulled in the opposite direction or laterally outwardly in order to move the closure slide to an uncovering position with respect to the lens tube opening and then project or advance the lens tube outwardly through such opening. Such an actuating member in the form of a telescopic cap is illustrated at 4. These two camera parts 1 and 4 are so adapted to one another that in the pushed-together condition shown in FIG. 3, they form a compact entity with the lens tube entirely within the body, with the lens tube opening in the front wall closed by the closure slide member, and with the shutter release member 3 covered so that it cannot be actuated.

Figure 4:
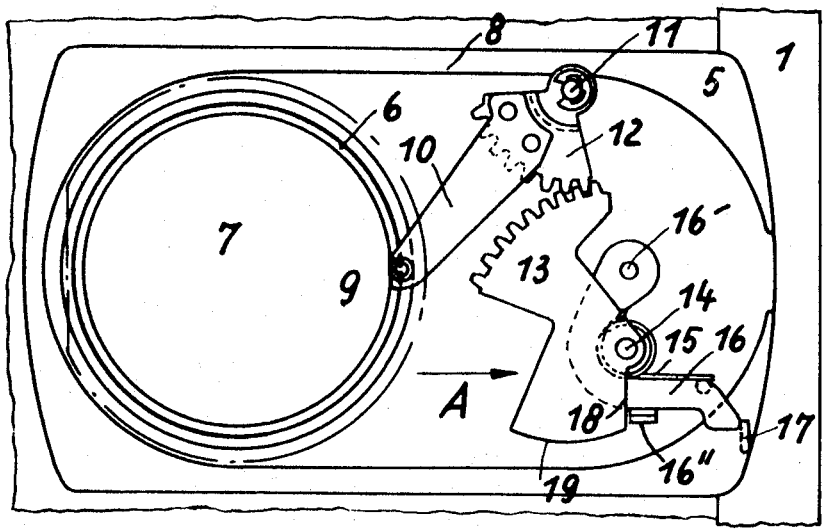
FIG. 4 is a fragmentary front elevational view of the camera with parts removed to show interior parts, illustrating particularly the mechanism for driving the slide which covers the lens tube opening when the lens tube is retracted, the parts being shown in the covering or closed position.
Figure 5:
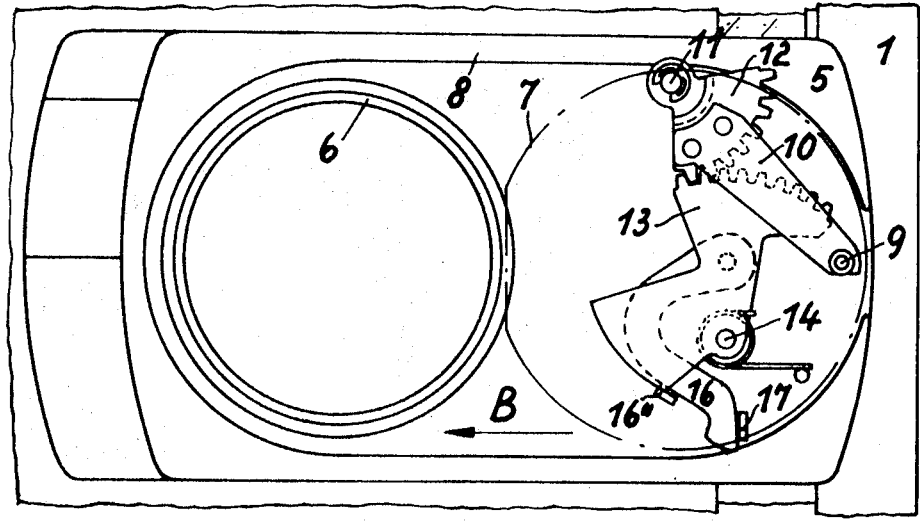
FIG. 5 is a similar view with the parts in an intermediate position in which the slide has been withdrawn from the lens tube aperture.
Figure 6:
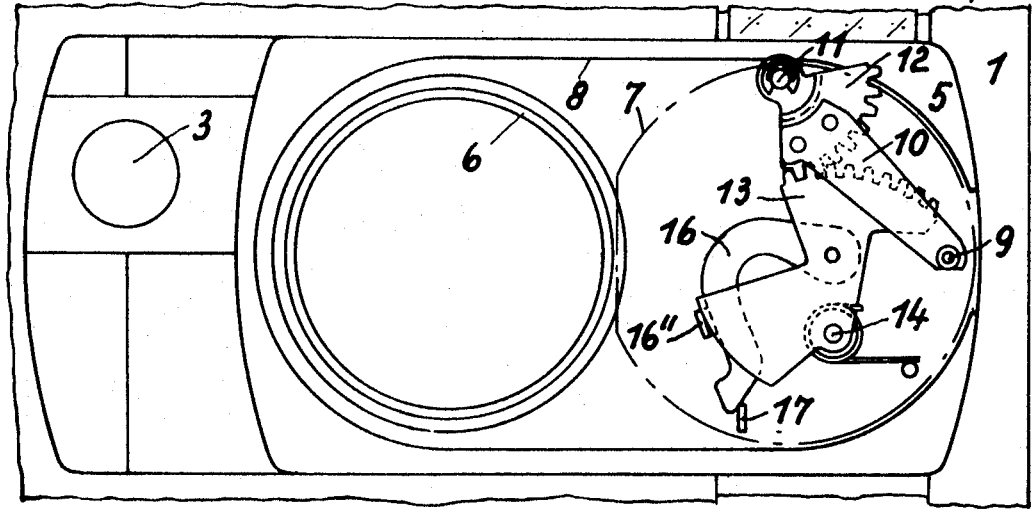
FIG. 6 is a similar view with the parts in the extreme or limit position ready for picture taking.

In the preferred embodiment illustrated, the front wall of the camera is not carried through smoothly in a single transverse plane, but is provided with a small stepped part 5 which contains the passage opening 6 for the lens tube. Also, within this stepped portion 5 are the closure slide and its driving or operating mechanism as illustrated in detail in FIGS. 4-6. All the parts illustrated in FIGS. 4-6 are mounted in or on the camera body 1, with the exception of the drive member 17 which is mounted on or operatively connected to the other camera part 4 to move therewith except when temporarily disconnected therefrom as mentioned below.

The closure slide forclosing the lens tube passage opening 6 is shown at 7, and is in the form of a circular disk which is movable in an oval guide passage 8 between its two limit positions. In its left position (FIG. 4) the lens tube passage opening 6 is closed by the disk-like slide 7. In the right hand limit position (FIGS. 5 and 6) the slide lies to the right of the lens tube opening, completely uncovering the lens tube opening.

The slide disk 7 is articulatedly connected by a pin 9 with a lever arm 10 which is rotatable about a fixed pin 11. In this connection the words "fixed" and "non-displaceable" are to be understood to mean that the parts referred to by these words are situated or mounted on the housing cap or boss 5 or on the camera body 1, as the case may be, rather than being mounted on and moving with the lens tube shifting member 4.

A gear tooth segment 12 is fixed to the above mentioned lever 10, for rotation about the fixed pivot 11. The teeth of the segment 12 engage with the teeth of a gear segment 13 which is mounted for rotation on the fixed pivot pin 14. A spring 15 tensions or biases the lever 13 in a counterclockwise direction, thereby tending to move the parts 10 and 12 clockwise on their pivot 11, so as to tend to shift the closure disk 7 leftwardly into its closed position shown in FIG. 4.

Another lever 16 is pivoted on a non-displaceable pin 16' mounted in the camera body. This lever 16 extends into the path of travel of a lug 17 which is mounted on the actuating part 4 to move therewith. This lever 16 carries a lug 16" which cooperates at times with a step or shoulder 18 and with a cam edge 19 on the lever 13.

In the rest or closed position, the parts are in the relationship shown in FIG. 4. If now the telescopic cap or actuating member 4 is opened out telescopically (that is, pulled leftwardly relative to the main camera body 1, or if the camera body is pulled rightwardly relative to and moving telescopic cap 4) the lug 17, being mounted on and moving with the actuating cap 4, will press leftwardly on the lever 16, turning this lever in a clockwise direction on its pivot 16'. This clockwise movement of the lever 16 will cause the lug 16' thereon to press against the stepped shoulder 18 so as to turn the gear segment 13 clockwise on its pivot 14. The member 13, thus being entrained and moved by the lug 16", swings the members 10, 12 in a counterclockwise direction, so that, because of the pin connection 9, the closure slide 7 is drawn to the right, in the direction of the arrow A in FIG. 4, moving it from the position of FIG. 4 to the position of FIG. 5, thereby clearing or opening the lens tube passage.

At this moment the lug 16" reaches the end of the shoulder 18 and leaves this shoulder, and then begins to slide along the cam edge 19 of the lever 13. This cam edge is so formed that on further movement of the lug 16" in the direction of the arrow B in FIG. 5, no further movement of the lever 13 takes place, but the lug 16" continues to move along the cam edge 19, holding the lever 13 stationary, until the final or limit position shown in FIG. 6 is reached. This additional movement of the members 17, 16, and 16" from the intermediate position shown in FIG. 5 to the final or limit position shown in FIG. 6, serves to push the lens tube outwardly through the opening 6 as a result of this further movement of the actuating member 4, and to lock it in the picture-taking readiness position. Conversely, when the two camera parts 1 and 4 are pushed together, the lens tube is unlocked and drawn into the camera housing, before the lens tube passage opening 6 is closed by the closure slide 7 in the final part of the pushing together of the two camera parts 1 and 4.

Figure 7:
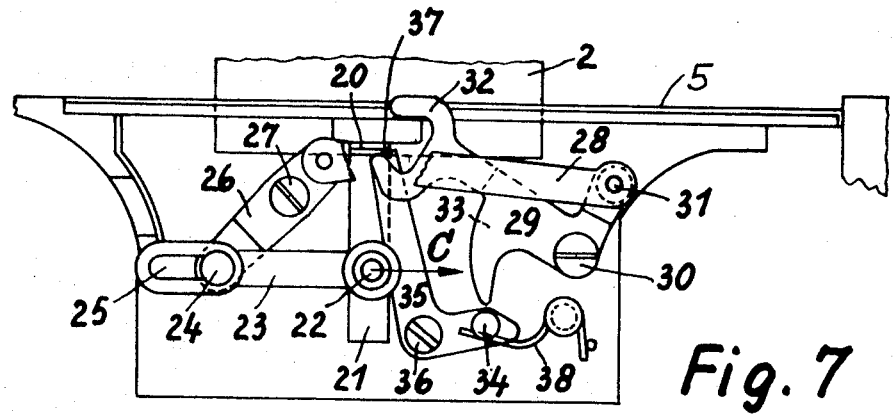
FIG. 7 is a fragmentary plan, with parts omitted, illustrating the drive mechanism for advancing and retracting the lens tube, the parts being in the advanced position ready for picture taking.
Figure 8:
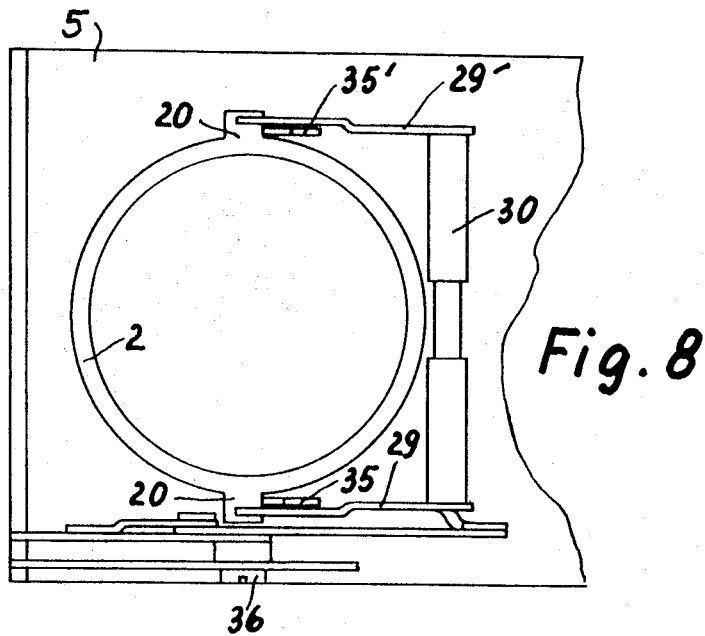
FIG. 8 is an elevational view of the parts shown in FIG. 7.
Figure 9:
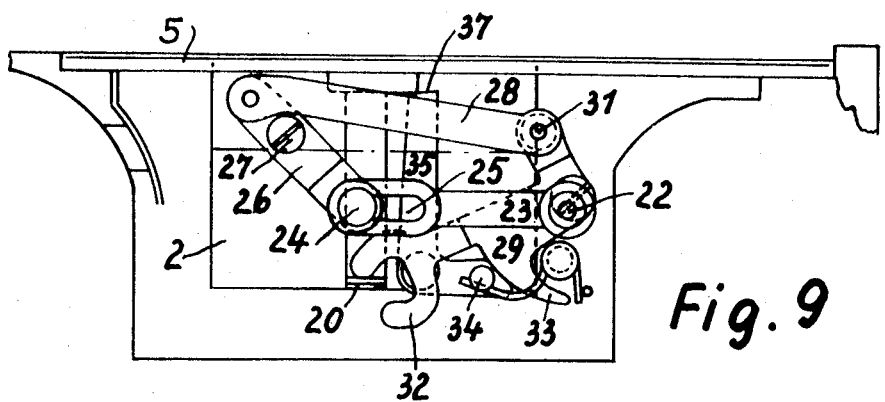
FIG. 9 is a view similar to FIG. 7, with the parts in the retracted position.

The mechanism for advancing and retracting the lens tube is illustrated in FIGS. 7-9. The lens tube 2 is guided for displacement in an axial direction (that is, in the direction of the optical axis) but is held against rotation by means of lugs 20 on the tube, engaging in corresponding axial grooves 21 in the camera housing 1. Preferably there is such a guiding lug at the top of the lens tube, and another at the bottom, with corresponding guiding grooves 21 both above and below the lens tube. Also, the parts which directly engage the lens tube to advance or retract it are duplicated both above and below the tube, so that equal retracting or advancing pressure is applied to the lens tube both at the top and at the bottom, in a symmetrical manner, to avoid any cocking or tilting of the tube during its axial movement and to promote smooth and easy movement thereof. Where appropriate, the elements of the second set of parts for moving the lens tube longitudinally are indicated, in FIG. 8, by the same reference numerals used for the elements of the first set of such parts, with the addition of a prime to each element of the second set.

Most of the operating parts illustrated in FIGS. 7-9 are mounted on the main camera body 1. However, there is a pivot pin 22 (FIGS. 7 and 9) which, like the member 17 previously described, is mounted on the other or actuating part 4 of the camera, to move therewith, except when the parts 17 and 22 may be temporarily disconnected from the actuating part 4 in order to permit the actuating part 4 to move for the purpose of feeding film without advancing or retracting the lens tube. This will be mentioned later.

The pin 22 is connected to one end of a draw rod 23, the other end of which has an elongated slot 25 receiving a pin 24 at one end of a double arm lever 26 pivoted on a fixed or nondisplaceable pin 27. The other end of this double lever 26 is connected by a draw rod 28 with a fork lever 29 which is rotatable with the connection shaft 30 which connects the fork lever 29 below the lens tube to a similar fork lever 29' above the lens tube, so that both fork levers move together to provide symmetrical pressure for advancing or retracting the lens tube.

At the end of each fork lever 29 (or 29') there is a fork 32 which cooperates with the previously mentioned guide lugs 20 on the lens tube. The fork is widened out so that a certain amount of play can take place in the pivoting movement of the lever 29 before the fork comes into engagement with the guide lug 20 in one direction or the other.

The fork lever 29 (and 29') has a cam extension 33, the cam edge of which cooperates with a pin 34 on one arm of a bellcrank lever 35 rotatable on the non-displaceable or fixed pin 36. A similar bellcrank lever 35' (FIG. 8) is located symmetrically above the lens tube. The second arm of each of these bellcrank levers has a wedge shaped end face 37 which can wedge itself behind the associated guide lug 20 of the lens carrier, under the influence of a spring 38 which acts upon the pin 34 of the lever 35 (and a similar spring acting on the similar pin of the lever 35') to latch the lens tube securely in its forward or extended position.

The forward latched position of the lens tube, ready for picture taking, is illustrated in FIG. 7. If the actuating member 4 is now moved to the closed or retracted position, this moves the pin 22 rightwardly, in the direction of the arrow C in FIG. 7. This pulls rightwardly on the draw rod 23, and after the extent of the lost motion allowed by the length of the slot 25, it moves the lever 26 counterclockwise on its pivot 27, moving the draw rod 28 leftwardly to swing the forked lever 29 counterclockwise on its pivot 30. This swings the rear prong of the fork 32 away from the rear face of the lug 20 on the lens tube. Before the front prong of the fork engages the front face of the lug 20, the cam projection 33 has meanwhile come into contact with the pin 34 on the latching lever 35 and has swung this latching lever clockwise on its pivot 36, thereby releasing the wedging end 37 from behind the lug 20. At about the time the latch is fully released, the front prong of the fork 32 comes into contact with the front face of the lug 20 and produces rearward pressure thereon, thereby drawing or retracting the lens tube 2 rearwardly into the camera body. The final limit position, with the lens tube retracted fully within the camera body, is illustrated in FIG. 9. The sizes and proportions of these parts in FIGS. 7-9 for effecting the longitudinal movements of the lens tube, are so related to the sizes and proportions of the parts in FIGS. 4-6 for operating the cover slide 7 that the withdrawal of the lens tube from its projected position to its retracted position occurs entirely while the lug 16'' is sliding along the arcuate cam edge 19 from the limit position shown in FIG. 6 to the intermediate position shown in FIG. 5, so that the closure slide 7 is not moved to its closed position until the lens tube is sufficiently retracted within the camera body. Then, during the final part of the movement, the lug 17 allows the lever 16 to move far enough so that the lug 16'' rides off of the cam edge 19 and onto the shoulder 18 and allows the spring 15 to shift the closure slide 7 from the open position of FIG. 5 to the closed position of FIG. 4, closing the lens tube opening.

When the actuating member 4 is moved in the opposite direction, to project the lens tube to a position ready for picture taking, the first part of the actuating movement shifts the lug 17 leftwardly (when viewed as in FIGS. 4 and 5) to draw the closure slide 7 rightwardly to a non-obstructing position as previously described. Meanwhile, however, the corresponding leftward movement of the pin 22 does not yet attempt to move the lens tube forwardly, because of the length of the slot 25, which permits a certain amount of leftward movement of the pin 22 before this movement entrains the rest of the linkage for advancing the lens tube. About the time that the closure slide 7 has been fully withdrawn so as to open the lens tube aperture, the end of the slot 25 comes into contact with the pin 24, so that the tube advancing linkage is set into motion. In other words, when the lug 17 and associated parts have reached the position shown in FIG. 5, the lever system of FIG. 9 also comes into operation. Then the further leftward movement of the pin 22 swings the lever 26 clockwise, and swings the fork lever 29 clockwise on its pivot 30, so that the rear arm of this fork acts on the lens tube lug 20 to push the lens tube forwardly. As soon as it has reached the picture-taking readiness position, the cam extension 33 liberates the pin 34 of the locking or latching lever 35, which now slides with its wedge edge 37 behind the guide lug 20 of the lens tube 2, under the influence of the spring 38, and locks the lens tube. All of these functions and operations are performed merely by the movement of a single actuating member in one direction to make the camera ready for picture taking, and in the opposite direction to collapse the camera to a smaller size convenient for carrying or storage. In the preferred form, as above mentioned, this actuating member is in the form of a telescopic member 4 which slides on the main camera body 1, but this is not necessarily the case and any convenient member movable on the body 1 first in one direction and then in the other direction, could be used for moving the lug 17 and pin 22 to accomplish the movements controlled thereby. But in the preferred form, in which the actuating member is in the form of a telescopic slide 4, it is seen that the movements are controlled merely by the pushing together or drawing apart of the two camera members 1 and 4.

It has already been mentioned that the film winding or advancing mechanism (frequently called the film transport) is preferably controlled also by the movement of the actuating member, whether such actuating member be in the form of the telescopic slide part 4 or whether it be in some other form. It is conventional and well known in the art to operate the film transport and also the shutter cocking or tensioning from a member which is movable on the camera body, and any conventional mechanism of this kind may be used according to the present invention, the details thereof being unimportant so far as the mechanism for advancing and retracting the lens tube and covering the lens tube opening is concerned. Thus all of the manipulations connected with making the camera ready for picture taking, including the winding of the film and the tensioning or cocking of the shutter, can be reduced to one single manual action of pulling the slide member 4 telescopically away from the main camera part 1, or moving some other actuating member in a single direction if it is preferred to use some other form of actuating member rather than the telescopic member 4.

As already briefly indicated, when several exposures are to be made in rapid succession, it is only necessary to operate the film winding mechanism and the shutter cocking or tensioning mechanism between successive exposures, and it should not be necessary after each exposure to retract the lens tube fully and then advance it again to its forward position. In order to accomplish this, provision can be made for interrupting the driving connection between the actuating member and the lens tube advancing and retracting means. A simple solution would be, for example, that the engaging member or lug 17 and the engaging pin 22 are not directly connected with the movable camera part 4 or other actuating member, but are connected thereto through an unlockable engaging device which is manually uncoupled before actuation and automatically engages again after execution of the film winding and shutter cocking stroke. Thus the actuating member can be actuated in the normal way to wind the film and cock the shutter ready for the next exposure, without moving the lens tube or the closure shutter, if the parts 17 and 22 are temporarily disconnected from the actuating member, as for example, by temporarily actuating a spring latch on the actuating member to disconnect from the actuating member a slide which carries the operating parts 17 and 22. Upon completion of a stroke, the latch again moves automatically into latching position unless it is again temporarily unlatched at the beginning of the next stroke.

What is claimed is:

1. A photographic roll film camera comprising a telescopic housing having two telescopically movable parts collapsible and extensible in a direction transverse to an optical axis of the camera, an axially movable lens tube retractable into said housing and projectable forwardly in a direction along said optical axis through an opening in a front wall of said housing, a lock for locking said lens tube in its forward position, a closure plate shiftable in a direction transverse to said optical axis from a position uncovering said opening to a position closing said opening, and operating means connected to said two telescopically movable parts of said housing for moving said closure plate to an uncovering position and projecting said lens tube to its forward position upon telescopic extension of said two housing parts and for retracting said lens tube into said housing and moving said closure plate to its closing position upon telescopic collapsing of said two housing parts.

2. A camera as defined in claim 1, wherein said two housing parts have approximately the same outline when viewed in the direction of telescopic collapse and extension thereof.

3. A camera as defined in claim 1, wherein said lock includes a spring actuated wedging member for wedging said lens tube in its forward projected position, and said operating means includes means for shifting said wedging member to a non-wedging position near the beginning of a collapsing movement of said two housing parts.

4. A camera as defined in claim 1, wherein said lens tube has an abutment portion (20), and wherein said lock includes a spring-biased latch member (35,37) engaging in locking relation behind said abutment portion when said lens tube is projected to its forward position, and spring means (38) biasing said latch member toward engagement with said abutment portion, and wherein said operating means includes means for shifting said latch member to non-locking relation to said abutment portion near the beginning of a collapsing movement of said two telescopic housing parts.

5. A camera as defined in claim 4, wherein said operating means includes means for shifting said latch member to non-locking relation to said abutment portion near the beginning of a collapsing movement of said two telescopic housing parts and means for retracting said lens tube into said housing during continued collapsing movement of said two parts and means for sliding said closure plate laterally into its closing position during a final portion of such collapsing movement of said two telescopic housing parts.

6. A camera as defined in claim 1, wherein said two telescopically movable parts of said housing include a first part (1, 5) of generally rectangular shape elongated in a direction perpendicular to the optical axis of the camera, said lens tube being carried by said first part, and a second telescopic part (4) also of generally rectangular shape and elongated in the same direction as said first part, said second part constituting a sleevelike structure surrounding at least three of the side walls of said first part and telescopically slidable relatively to said first part in the direction of elongation of both parts.

* * * * *